Oct. 11, 1960

B. F. GROSSLING 2,956,261

BUBBLE OSCILLATION ELIMINATOR

Filed Jan. 26, 1956

INVENTOR
BERNARDO F. GROSSLING
BY
ATTORNEYS

– – –
United States Patent Office 2,956,261  
Patented Oct. 11, 1960

2,956,261

BUBBLE OSCILLATION ELIMINATOR

Bernardo F. Grossling, Whittier, Calif., assignor to California Research Corporation, San Francisco, Calif., a corporation of Delaware Filed Jan. 26, 1956, Ser. No. 561,593

4 Claims. (Cl. 340—15)

My invention relates to a method of improving the intelligibility of a seismic record, and particularly to a method for removing bubble pulses from a seismic record.

In the conventional practice of offshore seismic surveying, a string of detectors is placed on the bottom of the ocean or slightly below the surface of the water. These detectors are connected to a multichannel recorder in a recording boat. A charge of explosive is detonated below the surface of the water to create a seismic disturbance. The seismic disturbance passes through the water, through the bottom of the ocean, and strikes a reflector which may be several thousand feet below the ocean bottom. The seismic disturbance is reflected from the reflector or subterranean discontinuity back to the seismic detectors in the water. The seismic detectors emit an electrical signal which is transmitted to the recording boat where a number of seismic traces coming from the different detectors are recorded on a single record.

The depth at which the explosive charge is placed below the surface of the water has been found to be a critical factor in the proper recording of seismic reflections. If the explosive charge is placed deep within the water, the explosive cavity or gas bubble from the explosion tends to pulsate. That is, the bubble expands and contracts a number of times before the energy of the explosion is completely dissipated.

Each contraction of the bubble results in the radiation of a secondary pulse of seismic energy. The secondary pulses occur on the seismic record at times when the reflected energy from the initial explosion is being recorded. The secondary pulses which travel directly to the detectors appear larger in amplitude on the record than the energy of the initial explosion reflected from the deep lying reflectors, and hence, obscure the desirable reflected energy arriving at the detectors. After the bubble oscillations cease, the signal received at the detectors is a composite of energy which originated at different times and was reflected from reflectors at different depths. The computation of individual bed depths becomes impossible under the circumstances.

In order to eliminate the problem arising from the pulsating bubble, it has been the practice to detonate the explosive source near enough to the surface of the water that the explosive will blow out at the surface decreasing the tendency of its bubble to pulsate. Such an operation is satisfactory in shallow depths where the explosive can be placed on or near the bottom, and yet the bubble will blow out at the surface without pulsating. Where seismic exploration is performed in deeper water, this arrangement tends to be unsatisfactory. The explosive source cannot be placed at a considerable depth without bubble oscillations occurring and confusing the resulting record. On the other hand, better utilization of the energy contained in the explosive results if the charge is placed on the bottom or at such a depth that the water effectively tamps the explosion. For example, I have found that the usable seismic record is at times twice as long if the explosive is detonated at the bottom of the ocean as it would be if the explosive were detonated in the water so that the shock wave is borne by the water to the bottom.

In order to make most efficient use of the explosive charge, the charge is detonated on or near the bottom with the result that in deeper water there may be a number of bubble pulsations. I have found that the seismic record due to the initial explosive pulse has the same shape as that due to each successive bubble pulsation. Accordingly, the seismic record consists of a series of seismic wave trains inextricably mixed through the record. Since the seismic waves due to bubble pulses are similar to the seismic waves due to the initial explosive pulse and both seismic waves are detected by the same instruments, there appears to be no method of separating the two groups of seismic waves before or after recording.

According to my method and apparatus, the seismic signal is first recorded, then the seismic signal due to the bubble pulses is subtracted from the record. In the practice of my invention, a reproducible recording is made of the seismic signals. This recording is then played back to make a second recording. Playback heads are placed on the second seismic record to provide a signal which is subtracted from the playback signal of the first seismic record to eliminate the signals due to the bubble pulses with the result that the second seismic record represents seismic signals due to the initial explosive pulse alone and all signals due to bubble pulses are eliminated by subtraction. Thus, in effect, the clean part of the seismic record is recorded and this clean part is played back through an appropriate attenuator to subtract from the seismic signal as it is being rerecorded a signal which is equal to the bubble pulses. Thus, the bubble pulse signals are eliminated from the seismic record by a feedback arrangement associated with the corrected record itself.

This arrangement is useful when a relatively minor amount of gain variation has been used in making the original seismic record. In the event that a substantial amount of gain variation has been made, a record of the amount of gain used in recording the seismic signal may be made. This record controls the attenuators in the feedback circuit associated with the clean seismic record so that the feedback signal is amplified as if it were recorded at the same instant as the signal from the original record from which the feedback signal is being subtracted.

The novel features of my invention are set forth with more particularity in the accompanying claims. The invention itself, however, with respect to the details thereof, together with its additional objects and advantages, may be better understood from the following description of specific embodiments with reference to the accompanying drawing, in which:

Figure 1:
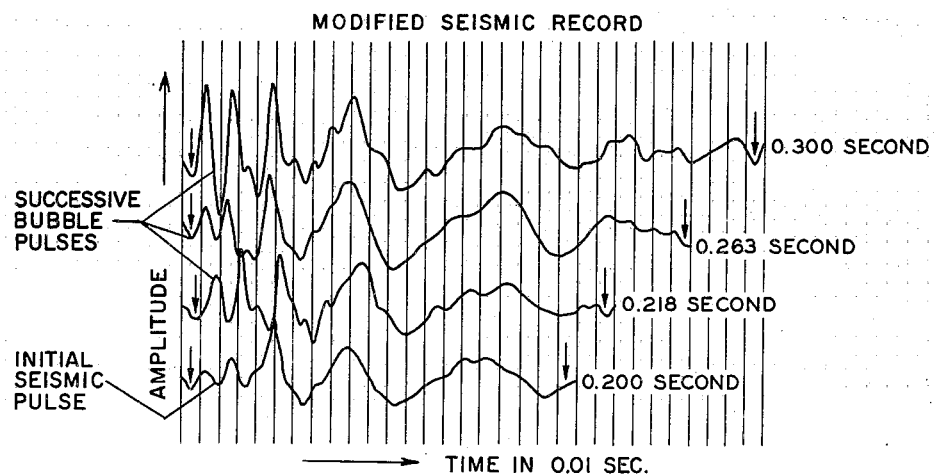
Fig. 1 shows an original seismic record resulting from the detonation of the explosive juxtaposed with the seismic signals representing bubble pulses.

In the original record, all four traces shown in Fig. 1 were sequential. The arrow at the end of the first line coincided with the arrow at the first of the second line; the arrow at the end of the second line coincided with the arrow at the beginning of the third line; the arrow at the end of the third line coincided with the arrow at the beginning of the fourth line. At the first part of the first line is clearly seen the first breaks. At the end of each line is shown the time to the first break at the end of that line, e.g. 0.300 second at the end of the first line. Fig. 1 shows on the first line the record of the energy received due to the initial explosive pulse due to the detonation of the explosive. The other three lines show the successive bubble pulses received.

The seismic record from which Fig. 1 was prepared had a number of traces representing the energy received from a number of detectors. For purposes of this explanation, we are presenting the single trace shown in this drawing. On the illustration given in Fig. 1, the first break from the first bubble pulse arrived 0.300 second after the first breaks. The first break from the second bubble pulse arrived 0.263 second after the first breaks of the first bubble pulse. The first breaks of the third bubble pulse arrived 0.218 second after the first break of the second bubble pulse. As can be observed from Fig. 1, the records representing the bubble pulses have a distinct similarly to the records representing the seismic energy from the original explosion. The bubble pulses have somewhat less energy than the original waves and the deviations of the bubble pulse signals from the original waves is attributed to noise and to events indicating reflections of the energy of the initial explosive pulse.

Figure 2:
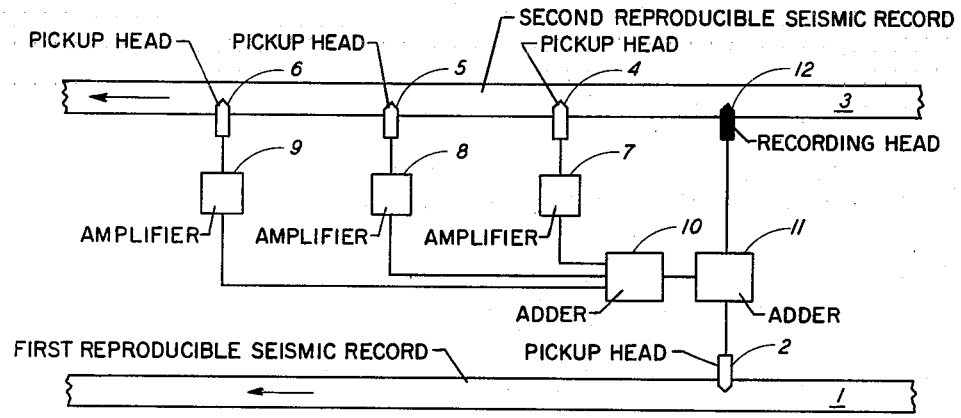
Fig. 2 shows apparatus for removing bubble pulses from a seismic record having a minor amount of gain variation.

Apparatus according to my invention is shown in Fig. 2. A first magnetic tape 1 contains a reproducible record of the signals from each group of seismic traces. The magnetic tape 3 initially contains no record but is suitable for recording the record from tape 1. A pickup head 2 detects the signal of one of the traces on the tape 1. The signal from the pickup head 2 passes into an adder 11. The output of the adder 11 is recorded by the recording head 12 on tape 3. The tapes 1 and 3 move to the left under the pickup and recording heads at the same speed. A pickup head 4 is spaced after the recording head 12 at the distance which the tapes 1 and 2 move during the interval between the first breaks of the energy from the original explosion and the first breaks from the first bubble pulse. Pickup heads 5 and 6 are respectively placed after the recording head 12 at a distance equal to the distance which the tape 3 moves between the first breaks of the original explosion and the first breaks of the second and third bubble pulses. A number of additional pickup heads similar to the pickup heads 4, 5, and 6 may be used if additional bubble pulses are to be removed from the record.

The pickup heads 4, 5, and 6 are connected through attenuators or amplifiers 7, 8, and 9 to an adder 10. The output of the adder 10 provides a second input to the adder 11. The attenuators or amplifiers 7, 8, and 9 reduce the amplitudes of the signals detected by the pickup heads 4, 5, and 6 by an amount which is preselected to be proportional to the amplitude of the bubble pulse signals on the original tape 1. The circuit elements 7, 8, 9, and 10 are adjusted so that the output of the adder 10 is equal to the component of energy detected by the pickup head 2 due to the first, second and third bubble pulses. The adder 11 subtracts the output of adder 10 from the output of the pickup head 2, thus permitting the recording head 12 to record on the tape 3 a seismic record which contains no disturbances due to bubble pulses. If more than three bubble pulses are found in the seismic record, additional pickup heads and attenuators or amplifiers similar to pickup head 6 and the attenuator or amplifier 9 are used. These pickup heads are spaced as are the pickup heads 4, 5, and 6 at the proper place to eliminate the bubble pulses.

In Fig. 2, I have described the bubble pulse remover for a single trace. To remove the bubble pulse from the remaining traces on the tape 1, the above-described process may be run through for each trace, moving the pickup and recording heads to the successive traces for each run through. Alternatively, there may be a pickup head 2 for each trace on the tape 1 and pickup and recording heads 4, 5, 6, and 12 provided for each trace as well as the remaining elements 7, 8, 9, 10, and 11 for each trace, so that each trace is simultaneously cleaned of the changes caused by bubble pulses and recorded on tape 3.

Mathematics may be used to explain more fully the operation of my invention. Consider a single trace. The signal produced by the initial explosive pulse is given by $S = S(t)$ where $S = 0$ when $t <$ time of first breaks The signals produced by the first bubble oscillation are given by $S_1 = k_1 S(t - t_1)$ where $S_1 = 0$ when $t < t_1 +$ time of first breaks.

$k_1 =$ relative amplitude of seismic signal received from first bubble pulse and from initial explosive pulse.

The signal produced by the second bubble pulse given by $S_2 = k_2 S(t - t_1 - t_2)$ where $S_2 = 0$ when $t < t_1 + t_2 +$ time of first breaks.

$k_2 =$ relative amplitude of seismic signal received from the second bubble pulse and the original explosion.

Then the signal observed and recorded on the tape 1 is $$S' = S + S_1 + S_2 + \ldots = S(t) + k_1 S(t - t_1) + k_2(t - t_1 - t_2) + \ldots$$

The head 2 reads $S'$
The head 4 reads $S(t - t_1)$
The head 5 reads $S(t - t_1 - t_2)$
The head 6 reads $S(t - t_1 - t_2 - t_3)$
The level adjustor 7 forms $k_1 S(t - t_1)$
The level adjustor 8 forms $k_2 S(t - t_1 - t_2)$
The level adjustor 9 forms $k_3 S(t - t_1 - t_2 - t_3)$
The adder 10 forms $$k_1 S(t - t_1) + k_2 S(t - t_1 - t_2) + k_3 S(t - t_1 - t_2 - t_3)$$

The adder 11 forms $$S' - k_1 S(t - t_1) + k_2 S(t - t_1 - t_2) + k_3 S(t - t_1 - t_2 - t_3) = S$$

Then $S$ is a clean seismic record which contains no indication of the signal caused by the bubble pulses, and which is recorded on tape 3.

In the method involved in my invention, a seismic record is recorded on the tape 1. The recording may be on a multitrace magnetic tape such as the tape 1 or any recording means which is reproducible in the sense that the tape may be read by a mechanical or electrical device. For example, a magnetic tape is a record of series of electrical signals which is placed on the tape by a recording head. A playback head, which may be physically the same instrument as the recording head, can be made to emit an electrical wave identical to the recorded series of electrical signals.

The reproducible seismic recording which contains signals due to the initial explosive pulse as well as signals originating with bubble pulses is played back for recording on a second reproducible seismic record. Playback heads on the second reproducible seismic record provide feedback signals which are mixed with signals from the playback on the first reproducible seismic record to provide a difference signal for recording on the second reproducible seismic record. Signals on the second reproducible seismic record are detected at positions such that the first breaks due to the initial explosive pulse is being detected at the time when the first breaks due to the different bubble pulses are being played back from the first reproducible seismic record.

The following procedure may be used to set the heads. The first reproducible seismic record may be marked at points where the first breaks caused by the initial explosive impulse and the first breaks due to the bubble pulses are recorded on that record. The first reproducible seismic record can then be laid in contact with the second reproducible seismic record. The point on the first reproducible seismic record which contains the first breaks due to the initial seismic impulse would contact the recording head 12 while the points representing the first breaks due to the successive bubble pulses would lie in contact with the playback heads 4, 5, and 6. I use the term "first breaks" to indicate the first arrival of energy due to the initial explosive pulse, where the initial explosive pulse is the energy due to the gaseous expansion as the source explodes. The "first breaks due to the successive bubble pulses" are the individual first arrivals of energy due to the successive contractions of the gaseous bubble in the water.

Only a part or fraction of the energy played back from the second reproducible seismic record 3 is subtracted from the energy output of the playback 2 on the first reproducible seismic record. The proper part or fraction to be used is determined by measuring the amplitudes of first breaks or signals due to the initial explosive pulse and the successive bubble pulses. The playbacks on the second reproducible seismic recording are reading a record due only to the initial explosive pulse. The signal from each of these playbacks is attenuated by a percent equal to the percentage by which the signals due to that particular bubble pulse are smaller than the signals due to the original explosive pulse. By this reference to attenuation I refer to a constant setting of an amplifier for rerecording a reproducible seismic record since amplification is ordinarily used in rerecording a reproducible seismic record. Thus, there is amplification between the playback head 2 and the recording head 12. The attenuators 7, 8, and 9 may be pure attenuators which, without prior amplification provide inputs for the amplifier from which the recording head 12 derives its energy, or an amplifier may be associated with the playback 2 and the elements 7, 8, and 9 may be amplifiers which are set to provide only a part of the energy which the adder 11 would receive from the same portion of the first seismic record. This attenuation adjustment is necessary because bubble pulses emit different, ordinarily less, energy than does the initial explosive pulse. Thus, the seismic record due to the bubble pulses would record less energy from the bubble pulses than from the initial explosive pulse. The attenuators or amplifiers 7, 8, and 9 are adjusted so that their outputs are approximately equal to the amplitudes of the signals due to the bubble pulses.

The above method is applicable when gain control is not a severe problem. The following system is useful where full allowance for gain variations is useful.

Figure 3:
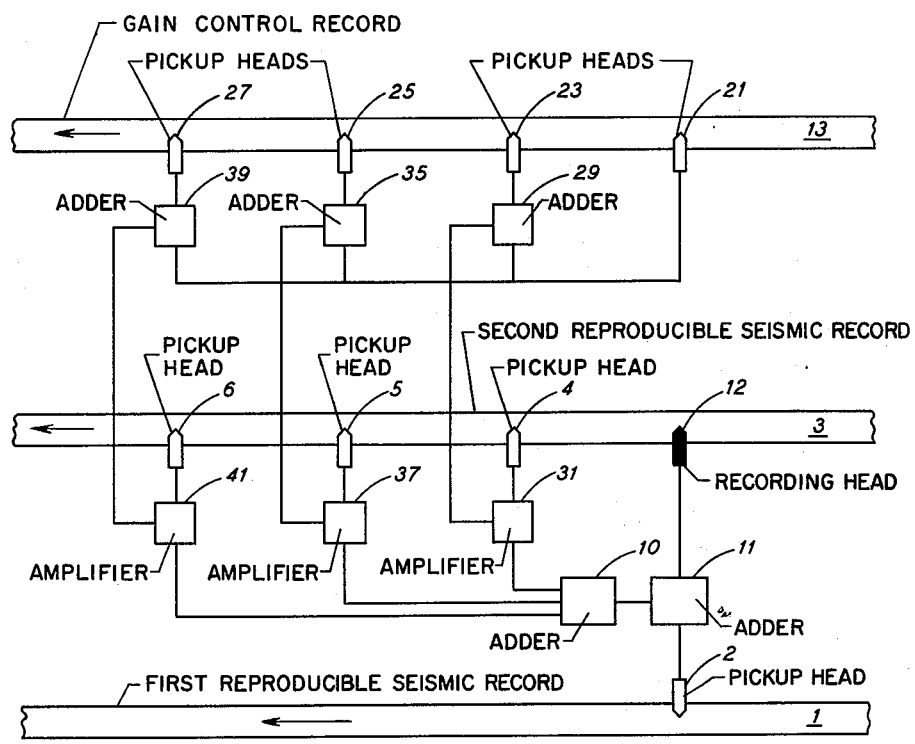
Fig. 3 shows apparatus for removing bubble pulses from a seismic record having a greater amount of gain variation.

As shown in Fig. 3 the magnetic tape 1 contains the seismic record, the signals from separate geophone groups being recorded as separate traces. In the recording of the signals on tape 1, volume control was employed. A tape 13 contains a trace on which the action of the volume control is recorded. To the extent that preset gain control was employed, the record on tape 13 consists of a smoothly varying curve. If automatic gain control was employed, the record on tape 13 involves an undulating signal. The gain control action may either be recorded directly or the logarithm of the gain control is recorded. In either event, my apparatus is operable. The tape 13 is adapted to move to the left in unison with the tapes 1 and 3. A pickup head 2 reads the seismic signal recorded on one trace providing one input to the adder 11. A recording head 12 on the tape 3 records the output of the adder 11. A pickup head 4 is displaced from the recording head 12 by the distance which the tape 3 moves between the first breaks caused by the initial seismic impulse and the first breaks due to the first bubble oscillation. Pickup heads 5 and 6 are displaced from the recording head 12 by distances respectively equal to the distance the tape moves between the first breaks due to the initial impulse and the first breaks due to the second and third bubble pulses.

A pickup head 21 on the tape 13 detects the gain control signal. This pickup head 21 is positioned in line with the recording head 12 and pickup head 2. Pickup heads 23, 25, and 27 are positioned on tape 13 and lined respectively with the playback heads 4, 5, and 6 on the tape 3. The output of the pickup heads 21 and 23 are fed to an adder 29 which subtracts the output of playback 23 from the output of the playback 21. The output of the adder 29 controls the operation of an amplifier 31. The bubble pulses are ordinarily weaker than the signal from the original seismic explosion. Accordingly, the amplifier 31 decreases the signal from the pickup head 4 to a value just sufficient to cancel the signal from the bubble pulse as detected by the pickup head 2. The output of the adder 29 controls the gain of amplifier 31 in accordance with the gain control signal on tape 13. The output of amplifier 31 becomes an input to an adder 10 which provides an input to the adder 11. The adder 11 subtracts the output of the adder 10 from the output of the pickup head 2.

An adder 35 subtracts the signal due to the pickup head 25 from the signal due to the pickup head 21. The output of the adder 35 becomes a control voltage controlling the gain of an amplifier 37. The output of the amplifier 37 becomes an input to the adder 10. An amplifier 39 subtracts the output of the pickup head 27 from the output of the pickup head 21 and provides a control voltage for an amplifier 41.

The output of the adders 29, 35, and 39 provides control signals for the amplifiers 31, 37, and 41 such that the gain of the amplifiers 31, 37, and 41 respectively are proportional to the anti-logarithm of the output of the amplifiers 29, 35, and 39.

In operation, the three tapes 1, 3, and 13 are passed under the recording and pickup heads at the same rate of speed. The pickup head 2 reads a seismic signal which is indicative of seismic energy due to the initial explosive pulse plus seismic energy due to the first, second and third bubble pulses as these signals are affected by gain control. Until the points on the tape 1 at which the first breaks due to the first bubble pulse arrive, the tape 1 is regarded as suitable for rerecording and is so recorded on tape 3. When the first breaks arrive under the pickup head 4 on the tape 3, the pickup head 4 then begins to feed into the amplifier 31 a signal proportional to the seismic energy due to the first bubble pulse.

The foregoing and the present explanation are based on the use of a gain control recording on tape 13 in which the logarithm of the gain control is recorded. Thus, subtracting the signal of the pickup head 23 from the signal at pickup head 21 forms the logarithm of the ratio of the gain control.

The operation of my apparatus may perhaps be better explained in mathematical symbols. The signal recorded as a result of the initial explosive pulse alone is $$S = g(t)S(t), \text{ when } S=0 \text{ when } t<t_0$$

$t$ = time, measured from instant of explosion,
$t_0$ = time of first breaks due to initial explosion, and
$g(t)$ = volume control function Signals produced by the first oscillation pulse are $$S_1 = g(t)k_1 S(t-t_1), \text{ where } S_1=0 \text{ when } t<t_1+t_0$$

Signals produced by the second oscillation pulse $$S_2 = g(t)k_2 S(t-t_1-t_2), \text{ when } S_2=0 \text{ when } t<t_1+t_2+t_0$$

The observed signal is $$S' = S + S_1 + S_2 \ldots = g(t)S(t) + g(t)k_1 S(t-t_1) + g(t)k_2 S(t-t_1-t_2) + \ldots$$

Head 21 reads $\ln g(t)$
Head 23 reads $\ln g(t-t_1)$
Head 25 reads $\ln g(t-t_1-t_2)$ Adder 29 forms $\ln \dfrac{g(t)}{g(t-t_1)}$ Adder 35 forms $\ln \dfrac{g(t)}{g(t-t_1-t_2)}$ Amplifier 31, by virtue of the gain control from adder 29 takes the antilog of the output of the adder 29, multiplies it by the output of the pickup head 4 to provide $$\frac{g(t)}{g(t-t_1)}g(t-t_1)k_1S(t-t_1) = g(t)k_1S(t-t_1)$$

Analogous functions constitute the output of amplifiers 37 and 41 so that the adder 10 adds together the outputs of amplifiers 31, 37, and 41 to provide a signal which is subtracted in adder 11 from the signal picked up by the head 2 to give:

$$S'(t) - g(t)\{+k_1S(t-t_1) + k_2S(t-t_1-t_2) + k_3S(t-t_1-t_2-t_3)\} = g(t)S(t)$$

$g(t)S(t)$ then is the input to the recording head 12 which records on the tape 3 a clean trace.

The circuits 31, 37, and 41 may be composed of circuits shown in Analog Methods in Computation in Simulation, Walter W. Soroko, McGraw-Hill, 1954. On page 66 of this book is shown a log circuit which may be put in the feedback circuit of an amplifier to take the antilog of the input. On pages 58–60 is shown a multiplication circuit. Thus, the output of the adders 29, 35, and 39 respectively form the input of the circuit which takes the antilog of this signal. Then this signal for each of the adders is multiplied respectively by the signals picked up by the heads 4, 5, and 6, thus providing the required input for the adder 10. The above description of circuit components is applicable where the tape 13 contains the logarithm of the gain control action. Where the absolute value of the gain control is recorded, the "adders" 29, 35, and 39 are in fact dividers. An approximate divider is shown on page 75 of the above-mentioned book. The output of the pickup head 23 is divided by the output of the pickup head 21. In the amplifier 31, this quantity is multiplied by the output of pickup head 4 to provide the proper input to the adder 10.

As I have described my method and apparatus, one trace of the seismic record is cleaned up at a time. Another run must be made for each other trace which must be clean. Alternatively, the recording and reproducible apparatus and associated components may be duplicated for each trace so that one run of the seismic record will suffice to clean each of the traces. It is not necessary that the reproducible recording be a magnetic tape. It is only necessary that reproducible recording be used so that electrical signals can be derived from the recording for rerecording. I have shown the use of three pickup heads to eliminate three bubble pulses. If more bubble pulses are found in the record, more pickup heads and associated apparatus may be employed so that the seismic record may be completely cleaned of signals caused by bubble pulses.

I claim:

1. Apparatus for making a second reproducible seismic record that is free of bubble pulse signals that are on a first reproducible seismic record obtained from an offshore seismic survey, comprising a playback head responsive to said first reproducible seismic record, means for moving said second reproducible seismic record relative to a recording heading in synchronism with movement of the first reproducible seismic record relative to said playback head, a first plurality of play back heads on said second seismic record, said plurality of playback heads being stationary relative to said recording head and displaced sequentially after said recording head by distances respectively equal the distance moved by said first reproducible seismic record in the time between the first breaks due to an initial seismic impulse and the first breaks of respective bubble pulse signals, amplifier means connected to each of said plurality of playback heads, means to adjust said amplifier means to attenuate the signals from each of said plurality of playback heads by a factor equal to the ratio of the magnitude of the first breaks of the respective bubble pulse signals to the amplitude of the first breaks of said initial seismic impulse signals on said first reproducible seismic record, means for subtracting the sum of the outputs of said amplifier means from the signal from said playback head and means for recording through the recording head a signal proportional to the difference between the sum of the outputs of said amplifier means and the output of said playback head.

2. Apparatus for obtaining a seismic record of an initial seismic impulse from a first seismic record on which is superimposed a record generated by a source additional to said initial seismic impulse comprising a first reproducible seismic record of an initial seismic impulse with an additional record derived from an additional source superimposed thereon, means for making a second reproducible record corresponding to said additional record, means for simultaneously moving said first and said second records past respective pickup heads to continuously generate respective electrical signals in each pickup head proportional to the variations on said records, means for placing the pickup head for said second record in a position relative to said second record to be affected by said second record at the same time that the pickup head for said first record is being affected by a corresponding portion of said additional record, means for modifying the amplitude of the electrical signal generated by the pickup head of said second record to have the same proportional relationship to the amplitude of the electrical signal generated by the pickup head of said first record that the amplitude of the record of the initial seismic impulse on said first record has to the amplitude of the said additional record, means for instantaneously subtracting the modified electrical signal from the pickup head of the said second record from the simultaneously generated electrical signal of the pickup head of the first record, and means for recording the resultant signal as said second record.

3. Apparatus for obtaining a seismic record of an initial seismic impulse from a first seismic record on which are superimposed records generated by sources additional to said initial seismic impulse comprising a first reproducible seismic record of an initial seismic impulse with additional records derived from additional sources superimposed thereon, respective second reproducible records corresponding to respective said additional sources, means for moving in synchronism said first and said second records past respective pickup heads to continuously generate in said pickup heads respective electrical signals proportional to the variations of said records and with the pickup heads for said second records located in respective positions to be affected by the variations on said second records at the same time that the pickup head for said first record is being affected by corresponding portions of the said additional records, means for modifying the respective amplitudes of the electrical signals generated by the said pickup heads for said second records to have the same proportional relationship to the amplitude of the electrical signal generated by the said pickup head for said first record that the amplitude of the record of the initial seismic impulse on said first record has respectively to the amplitudes of the said additional records, means for instantaneously subtracting the modified electrical signals from the said pickup heads for said second records from the simultaneously generated electrical signal of the said pickup head of the said first record, and means for recording the resultant signal as one for said second records.

4. Apparatus for making a second reproducible record containing seismic signals due to an initial explosive pulse alone from a first reproducible record containing seismic signals due to an initial explosive pulse with seismic signals superimposed thereon due to bubble pulses following said initial explosive pulse and from a gain control reproducible record which contains a record of the gain as a function of time of an amplifier through which said first reproducible record was recorded, comprising a playback head on said first reproducible record, a recording head and a first plurality of playback heads on said second reproducible record, a second plurality of playback heads on said gain control reproducible record, means for moving each of said reproducible records past its respective heads at the same speed, the individual heads of said first plurality of playback heads are located in respective sequential positions spaced after said recording head the distance moved by said second reproducible record between the first breaks of the said seismic signal due to said initial explosive pulse and the first breaks of the seismic signal due to a respective bubble pulse, one of said second plurality of playback heads is located at the point on said gain control reproducible record which corresponds to the point at which said playback head is placed on said first reproducible record, the remaining individual heads of said second plurality of playback heads are located in respective sequential positions spaced after said one playback head the distance moved by said gain control reproducible record between the first breaks of the seismic signal due to said initial explosive pulse and the first breaks of the seismic signal due to a respective bubble pulse, a first adder means connected to said second plurality of play back heads for combining the outputs of said one of said second plurality of playback heads with the respective output of each of the said remaining individual heads of said second plurality of playback heads to produce a respective signal which has a value proportional to the ratio of the output of said one of said second plurality of playback heads and each of the said remaining individual heads of said second plurality of playback heads, respective amplifier means connected to said first adder means and to said first plurality of pickup heads to amplify the respective outputs from said first plurality of pickup heads in proportion to the respective signal from a corresponding portion of said first adder means, a second adder means connected to said amplifier means and to said playback head on said first reproducible record to subtract the signal from said amplifier means from the output of said playback head on said first reproducible record and means connecting said recording head with said second adder means to record the resultant signal from said second adder means as the record on said second reproducible record.

References Cited in the file of this patent

UNITED STATES PATENTS

| | | |
|---|---|---|
| 2,105,318 | Goldsmith | Jan. 11, 1938 |
| 2,275,735 | Clond | Mar. 10, 1942 |
| 2,620,890 | Lee | Dec. 9, 1952 |
| 2,657,276 | Eliot | Oct. 27, 1953 |
| 2,734,944 | Green | Feb. 14, 1956 |
| 2,774,056 | Stafford | Dec. 11, 1956 |
| 2,794,965 | Yost | June 4, 1957 |

UNITED STATES PATENT OFFICE
CERTIFICATION OF CORRECTION

October 11, 1960

Patent No. 2,956,261

Bernardo F. Grossling

It is hereby certified that error appears in the above numbered patent requiring correction and that the said Letters Patent should read as corrected below.

Column 3, line 18, for "similarly" read -- similarity --; column 7, line 63, for "heading" read -- head --; column 8, line 65, for "of" read -- for --; line 66, for "for" read -- of --.

Signed and sealed this 9th day of May 1961.

(SEAL)
Attest:
ERNEST W. SWIDER
Attesting Officer

DAVID L. LADD
Commissioner of Patents